Figure 1:
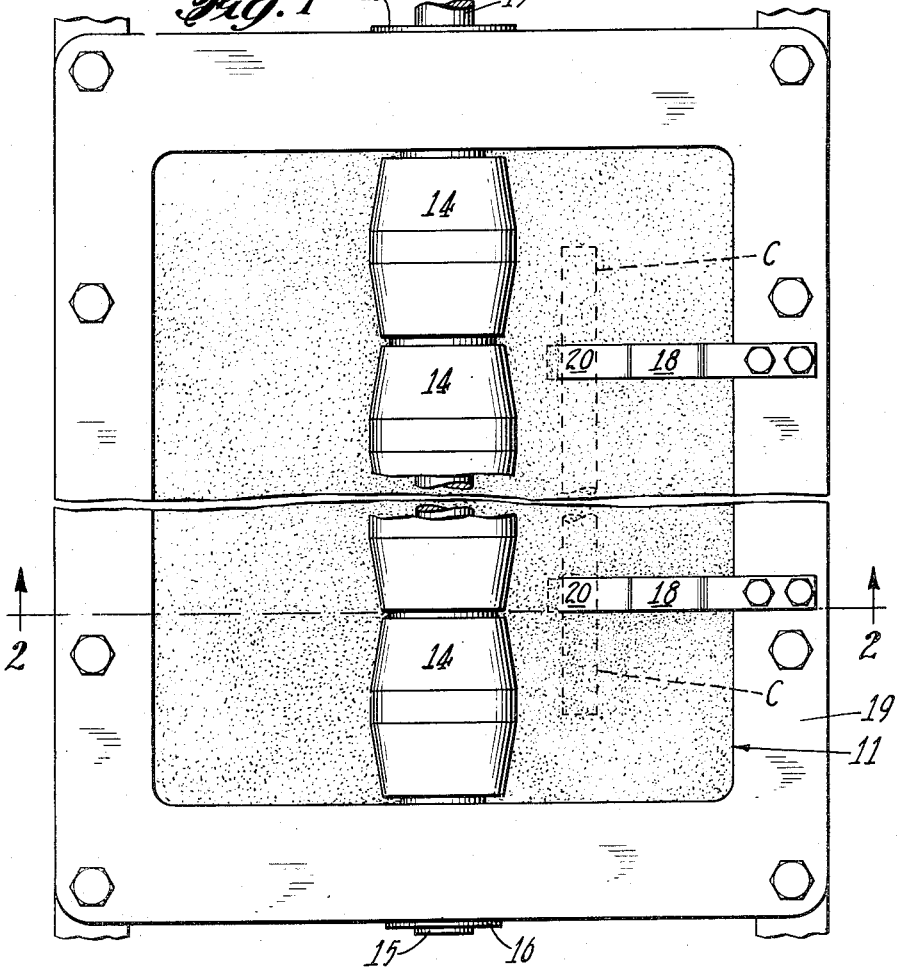

Sept. 28, 1954     W. H. SCHOENFELD, JR     2,690,005
METHOD OF AND APPARATUS FOR SOLDERING ARTICLES
WITH TINLESS SOLDER SUSTAINED WITH ZINC BAR
Filed Dec. 24, 1951

INVENTOR.
WILLIAM H. SCHOENFELD, JR.
BY *Charles H. Erne*
*Leland R. McCann*
*George W. Reiber*
ATTORNEYS Patented Sept. 28, 1954

2,690,005

UNITED STATES PATENT OFFICE 2,690,005

METHOD OF AND APPARATUS FOR SOLDERING ARTICLES WITH TINLESS SOLDER SUSTAINED WITH ZINC BAR

William H. Schoenfeld, Jr., Glen Ellyn, Ill., assignor to American Can Company, New York, N. Y., a corporation of New Jersey Application December 24, 1951, Serial No. 263,091

4 Claims. (Cl. 29—488)

The present invention relates to a method of and apparatus for soldering metal articles with a tinless solder and has particular reference to a lead-zinc solder and to maintaining the zinc content in solution when such a solder is held molten under prolonged heating and agitation.

In the manufacture of sheet metal containers or cans there has been a long felt need for a tinless solder to relieve the situation cause by the scarcity of tin used as an ingredient of well known lead-tin solders. It has been found the a lead-zinc solder when properly proportioned is comparable in every respect with the lead-tin solders. However, when the lead-zinc solder is held in a molten state under prolonged heating and agitation, as in machines used for soldering the side seams of cans, the zinc oxidizes more rapidly than lead and over a period of hours is completely removed from solution to form a slag of oxidized zinc on the surface of the molten lead.

In the instant invention provision is made for maintaining the zinc content of the solder at a substantially constant percentage by weight in a manner which is novel and efficient.

An object of the invention is the provision of a method of and apparatus for soldering articles with a lead-zinc solder wherein tin is entirely eliminated from the solder so as to conserve the use of this now highly scarce material and wherein the very small concentration of zinc is constantly controlled and maintained in solution.

Another object is the provision of a method of and apparatus for soldering articles with a lead-zinc solder wherein control over the small amount of zinc content of the solder is effected in such a manner as to hold the zinc content substantially constant, so that the solder may be held in a molten state under prolonged heating and agitation for use in automatic soldering operations.

Numerous other objects and advantages of the invention will be apparent as it is better understood from the following description, which, taken in connection with the accompanying drawings, discloses a preferred embodiment thereof.

Figure 2:
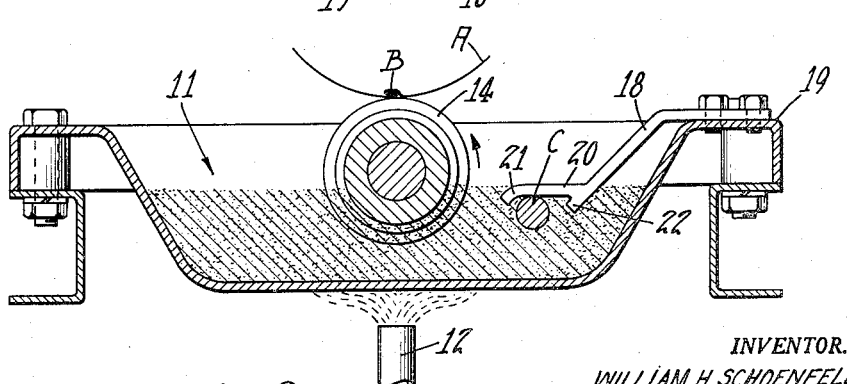

Referring to the drawings:

Figure 1 is a plan view of one form of apparatus for carrying out the method steps of the instant invention, with parts broken away; and Fig. 2 is a transverse sectional view taken substantially along the line 2—2 in Fig. 1, the view showing the side seam of a can body being soldered, parts of the apparatus and the can body being broken away.

As a preferred or exemplary embodiment of the instant invention the drawings illustrate one form of apparatus for carrying out the method steps of soldering articles with a lead-zinc solder maintained in a molten condition and a substantially constant zinc content. The zinc in the mixture is utilized mainly as an alloying or wetting agent to effect proper flow of the lead onto an article to be soldered. As an example of articles to be soldered the drawing illustrates in Fig. 2 a tubular sheet metal can body A having a conventional side seam B to be soldered along its full length, although the invention is equally well adapted to many other types of articles.

The method of soldering the articles includes the preparation of the solder and its maintenance in working condition. In preparing the solder a required quantity of lead is weighed out and heated to a molten condition. This molten lead is then heated to substantially 825° F. The maximum quantity of zinc that will go into solution with lead is 0.5% by weight of the lead-zinc mixture. In the preparation of the solder this maximum zinc content should be adhered to as closely as possible. Hence, as the next step in the method a quantity of zinc equivalent to 0.5% by weight of the lead-zinc mixture should be measured out and added to the molten lead. The melting point of the zinc is approximately 786° F. The mixture of lead and zinc should be agitated as the zinc melts into the molten lead. This results in a solder mixture of substantially 99.5% lead and 0.5% zinc by weight.

When the molten lead and zinc have become thoroughly mixed by agitation, the temperature of the mixture is reduced to approximately 700° F.–740° F. which is the range recommended for maintaining the molten mixture in condition for application to the articles to be soldered. In order to maintain the zinc content of this lead-zinc solder mixture, a solid sacrificial bar C (Fig. 2) of zinc is added. The bar is immersed in the solder bath and permitted to remain in position. Since the soldering temperature of the mixture (700° F.–740° F.) is below the melting point of the zinc bar, the bar remains in solid form. As the zinc in the solder is oxidized and removed from solution the zinc in the bar is slowly dissolved and thereby places into solution sufficient zinc to replace the loss of zinc caused by oxidation when the solder is maintained under prolonged heating as is required in automatic machines for effecting the soldering operation. In this manner the zinc content of the mixture may be maintained at its maximum over long periods of time.

In some cases where the soldering of tinned articles is effected by a rotating solder roll, it has been found that the maximum zinc content of the solder mixture is required only until the roll has been wetted sufficiently to thoroughly coat the roll with the solder. Thereafter, the zinc content may be allowed to drop if desired, to substantially 0.05% of the mixture by weight. Where the solder is to be applied directly to base metal such as black iron or steel, replenishment of the solder bath may be effected preferably by the lead-zinc mixture. However where the base metal is coated with tin, replenishment of the solder bath may be effected by adding lead alone.

Since the dissolving action of the zinc bar takes place on its outer surface, the bar should preferably have as large a surface area as possible. A one inch diameter bar twenty inches long having a surface area of approximately 64 square inches has been found satisfactory for the conventional can body soldering machines. When such a bar is reduced to substantially three-eighths of an inch in diameter it should be replaced with a new bar or may be retained in addition to the new bar to provide sufficient surface area. After placing the sacrificial zinc bar in the solder bath the temperature of the bath should never be permitted to exceed approximately 760° F. so as to prevent melting of the bar.

One form of apparatus for carrying out the method steps of the instant invention includes a reservoir 11 (Figs. 1 and 2) for holding the molten solder mixture of substantially 99.5% lead and 0.5% zinc by weight. This bath of solder is maintained in molten condition at the proper temperature by a conventional heating element such as a gas burner 12 disposed below the reservoir 11 in such a manner as to project a flame against the reservoir bottom.

The molten solder within the reservoir 11 is applied to the articles to be soldered, such as the side seams B, of the can bodies A, by a conventional rotatable solder roll 14 which is partially immersed in the bath of solder as shown in Fig. 2. The ends of the solder roll preferably are provided with trunnions 15 which are journaled in bearings 16 formed in the ends of the reservoir. The solder roll may be rotated in any suitable manner. To receive the solder, the can bodies A preferably are guided and propelled longitudinally across the solder roll 14 with their side seams B in engagement with the roll in the usual manner such as disclosed in United States Patent 1,939,723 issued December 19, 1933, to John F. Peters on Soldering Machine.

The sacrificial bar C of pure zinc used for maintaining constant the zinc content of the mixture is held in immersed position in the bath of solder preferably by a pair of spaced and parallel arm brackets 18. The outer ends of the brackets are secured to a top rim 19 of the reservoir. The inner ends of the brackets 18 extend into the reservoir and into the bath of solder therein and terminate below the surface of the solder, in a bar holding member 20. This holding member 20 preferably is of an inverted U-shape, having two depending short legs 21, 22 spaced apart a sufficient distance to accommodate between them at least two sacrificial bars of zinc placed side-by-side.

Space is provided between the holding members 20 and the solder roll 14 so that a sacrificial bar of zinc C may be readily immersed in the solder adjacent the solder roll and pushed under the holding members 20 to retain the bars C in place. The depending legs 21, 22 of the holding members prevent lateral displacement of the bars during their dissolving action.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. A method of soldering articles which comprises providing a solder mixture consisting of about 99.5% lead and about 0.5% zinc by weight, maintaining said solder mixture in a molten condition at a temperature below the melting point of zinc, immersing a solid bar of zinc in the molten solder for surface dissolution into said solder to compensate for oxidation loss of zinc from said mixture to maintain the zinc content of said solder mixture substantially constant, and applying said molten solder to articles to be soldered.

2. A method of soldering articles which comprises preparing a bath of molten lead, then melting in and mixing with the molten lead a quantity of zinc not exceeding about 0.5% of the weight of the lead to produce a solder consisting of about 99.5% lead and about 0.5% zinc by weight, holding said molten solder within a temperature range below the melting point of zinc to maintain the solder in a molten condition, maintaining a solid sacrificial bar of pure zinc immersed in said molten solder for slow dissolution into said molten solder to compensate for loss of zinc through oxidation during agitation of the solder and to thereby maintain the zinc content of said solder substantially constant, and applying said molten solder to articles to be soldered.

3. In an apparatus for soldering articles, the combination of a solder reservoir containing a bath of molten solder consisting of about 99.5% lead and about 0.5% zinc by weight, means in said bath of molten solder for applying said solder to said articles, heating means for maintaining said solder in a molten condition at a temperature below the melting point of zinc, and a holder in said reservoir for retaining a sacrificial bar of pure zinc submerged in said solder bath for dissolution therein to compensate for oxidation loss of zinc from said solder to maintain the zinc content of said solder substantially constant.

4. In an apparatus for soldering articles, the combination of a solder reservoir containing a bath of molten solder consisting of 99.5% lead and 0.5% zinc by weight, means in said bath of molten solder for applying said solder to said articles, heating means for maintaining said solder in a molten condition at a temperature below the melting point of zinc, and a pair of spaced bracket arms secured to said reservoir, said arms having inverted U-shaped holding members submerged in said bath of solder, said members having a length sufficient to hold at least two sacrificial bars of pure zinc submerged in said bath of solder for dissolution therein to compensate for oxidation loss of zinc from said solder to maintain the zinc content of said solder substantially constant.

References Cited in the file of this patent

UNITED STATES PATENTS

| Number | Name | Date |
|---|---|---|
| 1,155,317 | Mark | Sept. 28, 1915 |

OTHER REFERENCES

Bray, Lead Coating of Steel, Am. Inst. of Mining and Met. Engrs., Transactions, vol. 124 pp. 199–207.